(12) United States Patent
Lovinggood et al.

(10) Patent No.: US 6,697,603 B1
(45) Date of Patent: Feb. 24, 2004

(54) DIGITAL REPEATER

(75) Inventors: Breck W. Lovinggood, Garland, TX (US); William P. Kuiper, Lucas, TX (US); John W. Kinzie, Garland, TX (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 09/460,023

(22) Filed: Dec. 13, 1999

(51) Int. Cl.[7] .............................................. H04B 7/185
(52) U.S. Cl. ..................... 455/13.1; 455/12.1; 455/11.1; 370/315; 370/316
(58) Field of Search ................................ 455/11.1, 131, 455/137, 138, 139, 140, 141, 168.1, 427, 12.1, 3.01, 3.02; 370/315, 316; 375/211, 214, 220, 320, 321, 328

(56) References Cited

U.S. PATENT DOCUMENTS

| | | | | |
|---|---|---|---|---|
| 5,535,240 A | * | 7/1996 | Carney et al. .............. 375/219 |
| 6,118,810 A | * | 9/2000 | Wynn .......................... 375/219 |
| 6,167,099 A | * | 12/2000 | Rader et al. ................. 375/347 |
| 6,253,060 B1 | * | 6/2001 | Komara et al. ................ 455/9 |
| 6,370,185 B1 | * | 4/2002 | Schmutz et al. ............ 375/214 |
| 6,389,078 B1 | * | 5/2002 | Hessel et al. ................ 375/259 |

* cited by examiner

Primary Examiner—Sinh Tran
Assistant Examiner—Temicha M. Davis
(74) Attorney, Agent, or Firm—Wood, Herron & Evans, L.L.P.

(57) ABSTRACT

A method of using a digital repeater for receiving and retransmitting radio frequency (RF) signals. The method including down converting a first RF signal to an intermediate frequency (IF) signal, converting the IF signal into a digital signal, processing the digital signal with a the digital signal processor, amplifying the digital signal into an amplified signal using the digital signal processor, and converting the amplified signal into an analog signal. The method further including up converting the analog signal to a second RF signal suitable for antenna transmission.

58 Claims, 9 Drawing Sheets

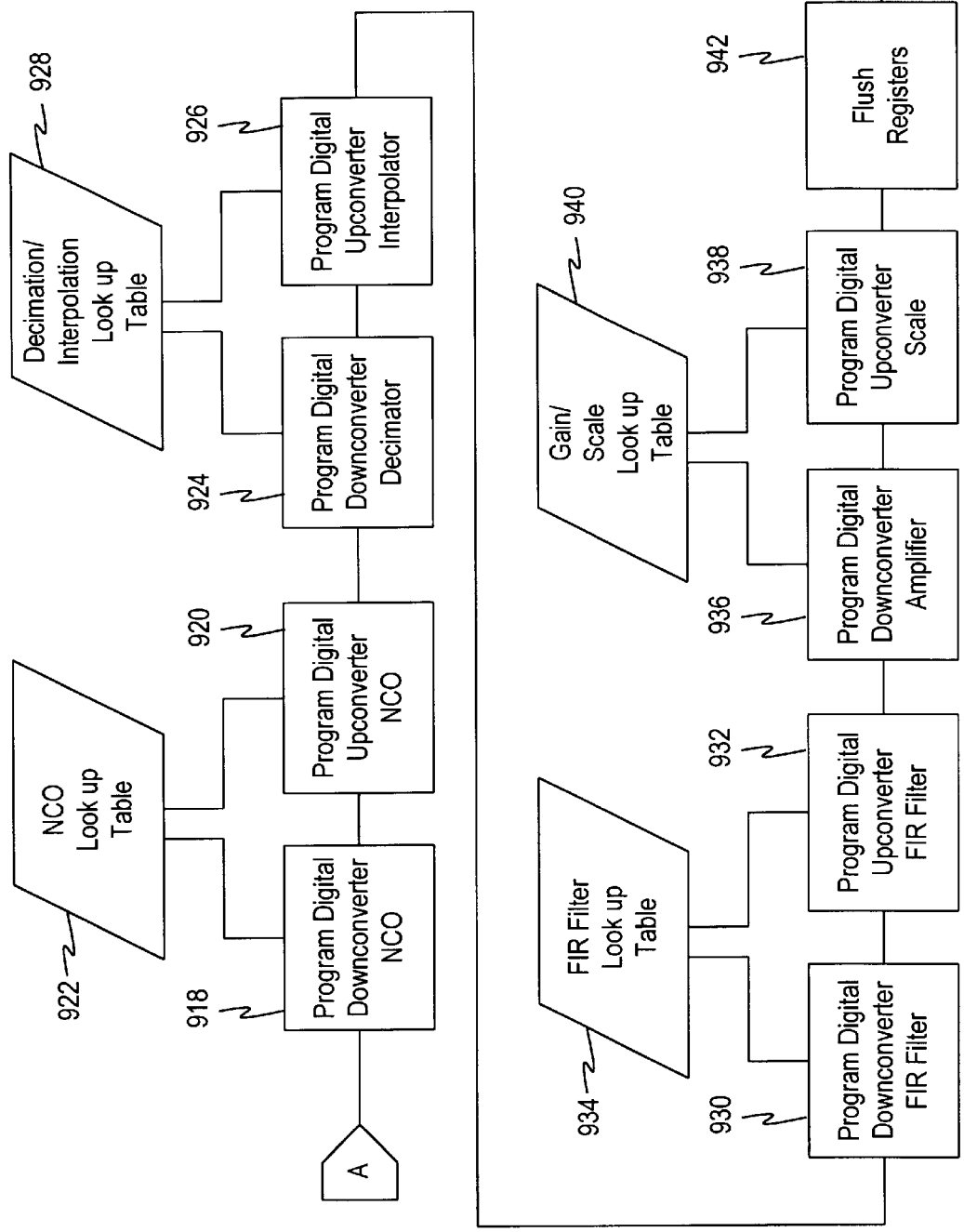

DIGITAL REPEATER

FIELD OF THE INVENTION

The present invention relates generally to repeaters. More particularly, it concerns a digital repeater having a digital signal processor that is software configurable for receiving and retransmitting radio frequency signals.

BACKGROUND OF THE INVENTION

Repeater systems are typically used where the area to be covered and/or capacity requirements do not justify the installation of a full base station system with managed frequency-channel allocation. Thus, tower-mounted repeater systems are often used to extend the range of a base station and to fill nulls in the coverage area of the base station. Nulls are regions that are blocked from receiving radio frequency (RF) signals. Nulls include hills, trees, buildings, etc.

The typical repeater system comprises three basic parts: a link antenna which is directed/aimed at the base station antenna; repeater electronics; and a broadcast antenna which is directed towards the area of interest. Often, the link antenna is highly directive (high gain) with a very narrow beamwidth because it only needs to "see" the base station antenna. The broadcast antenna has a larger beamwidth which is determined by the intended area to be covered. The repeater electronics may contain an assortment of diplexers, filters, splitters, and RF amplifiers. A typical repeater system includes a forward path from the base station (BS) antenna to a receiving apparatus and a reverse path from the receiving apparatus to the BS antenna.

Two primary performance factors on which an antenna system is based are gain and output power. The output power is mostly determined by the sum of the link and broadcast antenna gains and the maximum (linear) output power of the amplifier(s). The system gain is determined by the sum of the passive antenna gains, plus the gain of the amplifier(s). This is limited by the isolation (or mutual coupling) between the broadcast and link antennas. The isolation depends on the antenna type, front to back (F/B) ratio and beamwidth.

Repeater systems are used in a variety of applications such as TV and radio transmission, cellular/PCS communications and pager services. Existing repeaters use analog technology and typically only provide one channel for the forward path and one channel for the reverse path. To obtain significant adjacent channel rejection, the RF signal must be converted to a fixed Intermediate Frequency (IF). Thus, each channel in a traditional repeater requires a dedicated down converter, a dedicated IF filter, a dedicated up converter and a dedicated synthesizer. A traditional analog repeater uses a Local Oscillator (LO) having a resolution of 12.5 kHz to 200 kHz. This sets the channel resolution of the entire repeater. The IF and bandwidth of an analog repeater are fixed based on the modulation format for which the repeater is designed. In addition, analog repeaters suffer from group delay and passband variations due to part-to-part variations in the IF surface acoustic wave (SAW) filter or crystal filter. Small impedance mismatches can create significant ripple in the passband response. In an analog repeater the shape factor of a SAW filter may have a 200 kHz to 400 kHz frequency difference between the 15 dB and 40 dB points. The passband response of an analog repeater is fixed by the IF SAW filter or crystal filter.

Therefore, there is a need for a repeater capable of: transmitting and receiving multiple channels which uses only a single RF down converter/RF up converter pair for each path, greater local oscillator resolution, processing multiple modulation formats without changing the repeater hardware, virtually identical filter performance despite impedance mismatches, allowing more channels to be placed closer together due to filters that have a shape factor with less than 1 kHz frequency difference between the 15 dB and 40 dB points, matching the modulation format used by the communications network, and automatically detecting the modulation format and changing the filter bandwidth based on the modulation format detected. The present invention is directed to addressing one or more of these needs.

SUMMARY OF THE INVENTION

A digital repeater for transmitting and receiving radio frequency (RF) signals. The digital repeater includes a down converter for down converting a first RF signal to an intermediate frequency (IF) signal. An analog-to-digital converter for converting the to IF signal into a digital signal. A digital signal processor for filtering and amplifying the digital signal. A digital-to-analog converter for converting the digital signal into an analog signal. The digital repeater further includes an up converter for up converting the analog signal to a second RF signal suitable for antenna transmission.

BRIEF DESCRIPTION OF THE DRAWINGS

Other objects and advantages of the invention will become apparent upon reading the following detailed description and upon reference to the accompanying drawings, in which:

FIGS. 6a and 6b are flowcharts showing how the repeater is software configurable according to one embodiment of the invention.

Figure 1:
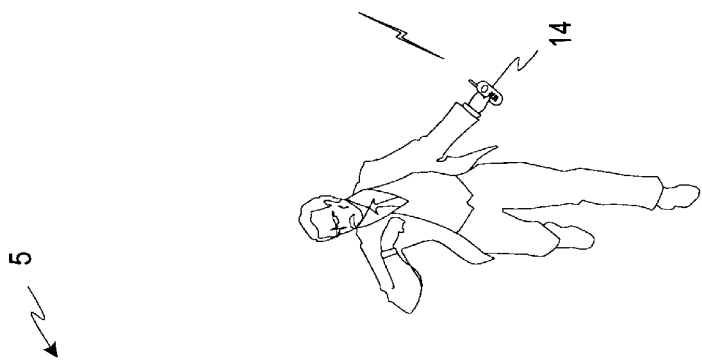
FIG. 1 is an antenna system for transmitting data according to one embodiment of the invention.
Figure 1:
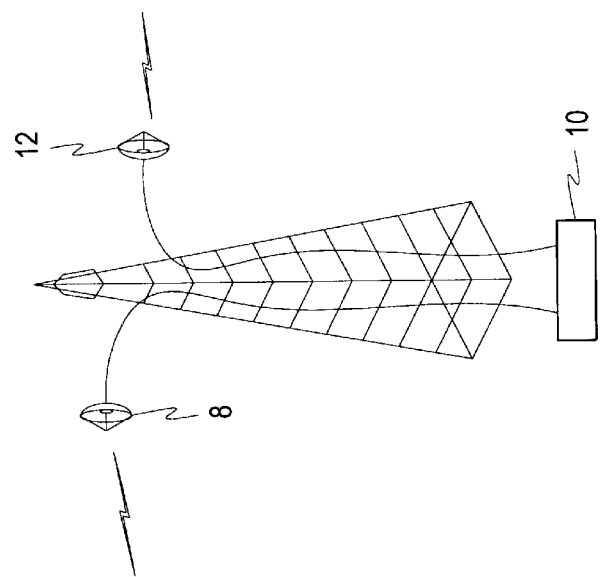
Figure 1:
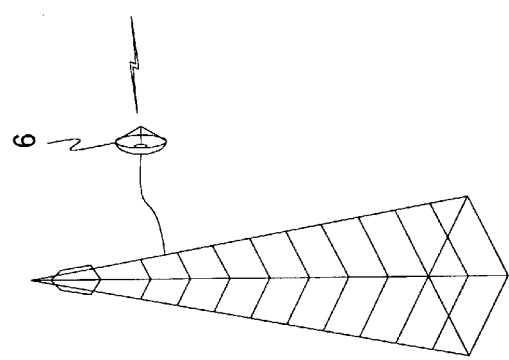

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

Referring to FIG. 1, there is shown an antenna system 5 for transmitting and receiving data between a base station antenna 6 and a receiving apparatus 14. The antenna system 5 includes a digital repeater 10 connected between a link antenna 8 and a broadcast antenna 12. The digital repeater 10 extends the coverage area of the originating base station antenna 6 and/or fills nulls in the coverage area of the originating base station antenna 6.

Figure 2:
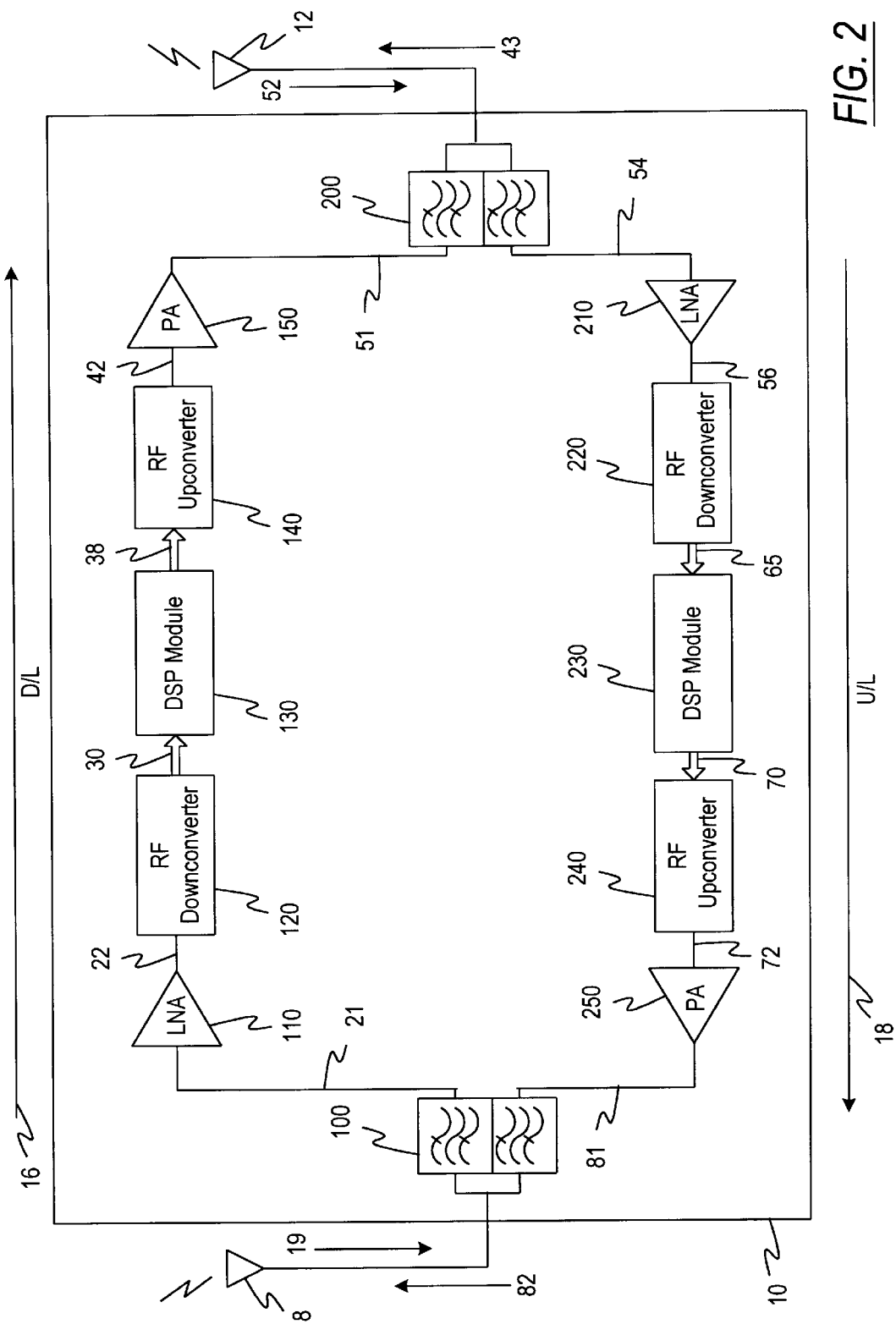
FIG. 2 is a schematic diagram of a digital repeater for use in the antenna system.

The digital repeater 10 transmits and receives RF signals to and from the receiving apparatus 14, as shown in FIG. 2.

The receiving apparatus 14 can comprise a pager, a TV or radio receiver, a cellular or PCS telephone, etc. The repeater 10 operates in both a transmit mode and a receive mode. For example, in one embodiment, the link antenna 8 is used to receive an incoming RF signal from the base station (BS) antenna 6 or from another repeater 10. The illustrated repeater 10 would therefore usually operate in the frequency band of the incoming RF signal or signals to be received. The broadcast antenna 12 is used in the broadcast/repeat mode to transmit (and receive) a signal(s) to the receiving apparatus 14, or to transmit a signal(s) to a further repeater 10 in a system using multiple repeaters 10 to broadcast or distribute an RF signal(s).

Thus, the repeater 10 operates in full duplex mode (i.e., operates in two directions simultaneously) using two separate frequencies, one for each direction. As shown in FIG. 2, the digital repeater 10 includes a forward path 16 (downlink path) and a reverse path 18 (uplink path). Thus, the repeater 10 provides two-way communication with one or more receiving apparatus 14. The forward path 16 communicates an RF signal(s); from the BS antenna 6 to the receiving apparatus 14 while the reverse path communicates an RF signal(s) from the receiving apparatus 14 to the BS antenna 6. A diplexer 100 is connected between the input of the forward path 16 and the output of the reverse path 18. Similarly, a second diplexer 200 is connected between the output of the forward path 16 and the input of the reverse path 18. The diplexers 100, 200 are used to separate the power for each path 16, 18 and to prevent noise wrap around from the forward path 16 to the reverse path 18, and vice-versa. RF signals 19 are received on the link antenna 8 and routed through the diplexer 100 and through the forward path 16. The second diplexer 200 then delivers filtered signals 43 to the broadcast antenna 12 which transmits the processed signals. In the reverse direction, the broadcast antenna 12 receives RF signals 52 which are fed through the diplexer 200 and through the reverse path 18. The first diplexer 100 then delivers filtered signals 82 to the link antenna 8 which transmits the processed signals.

The digital repeater 10 is a multichannel repeater which can process multiple channels simultaneously in each path 16, 18. Therefore, the RF signals, such as the RF signals 19, 52, each contain one or more signals each at a different frequency (channel).

The diplexer 100 acts as a band pass filter adapted to receive the incoming RF signals 19 and only pass filtered signals 21 within a first specific band of frequencies. In one embodiment, the first specific band of frequencies are between about 1850 MHz and 1865 MHz; 1870 MHz and 1885 MHz; and/or 1890 MHz and 1905 MHz. The diplexer 100 also allows one port to be a common connection for incoming downlink signals and outgoing uplink signals. The diplexers 100 and 200 determine which operating frequency band(s) will be accepted by the repeater 10. For example, in one embodiment, a PCS 1900 MHz repeater would operate in one of three bands: sub-band A, sub-band B or sub-band C. The operating frequencies for these bands are as follows:

| Band | Uplink Input Frequency | Downlink Output Frequency |
|---|---|---|
| A | from 1850 to 1865 MHz | from 1930 to 1945 MHz |
| B | from 1870 to 1885 MHz | from 1950 to 196 5MHz |
| C | from 1890 to 1905 MHz | from 1970 to 1985 MHz |

The diplexer 100 serves to separate low power downlink input signals 19 from high power uplink output signals 82. For example, the power level of the outgoing uplink signal (filtered signal 82) is typically several Watts while the power level of the incoming downlink signal (RF signal 19) is typically in the micro-Watt to milli-Watt range. The diplexer 100 isolates the downlink path from the high power uplink path. In one embodiment, the forward path 16 also includes a low noise amplifier 110 for amplifying the filtered signals 21 and producing amplified signals 22. The low noise amplifier 110 is a wideband RF device whose input must be isolated from high power uplink signals. The diplexer 100 isolates the low noise amplifier 110 from those high power uplink signals that can prevent proper operation of the repeater 10.

The low noise amplifier 110 sets the repeater noise figure in the downlink direction. The noise figure is related to the noise factor, which is the signal-to-noise ratio (S/N) at the input of the repeater 10 divided by the S/N at the output of the repeater 10. The noise figure=$10*\text{Log}_{10}$ (noise factor).

Figure 4A:
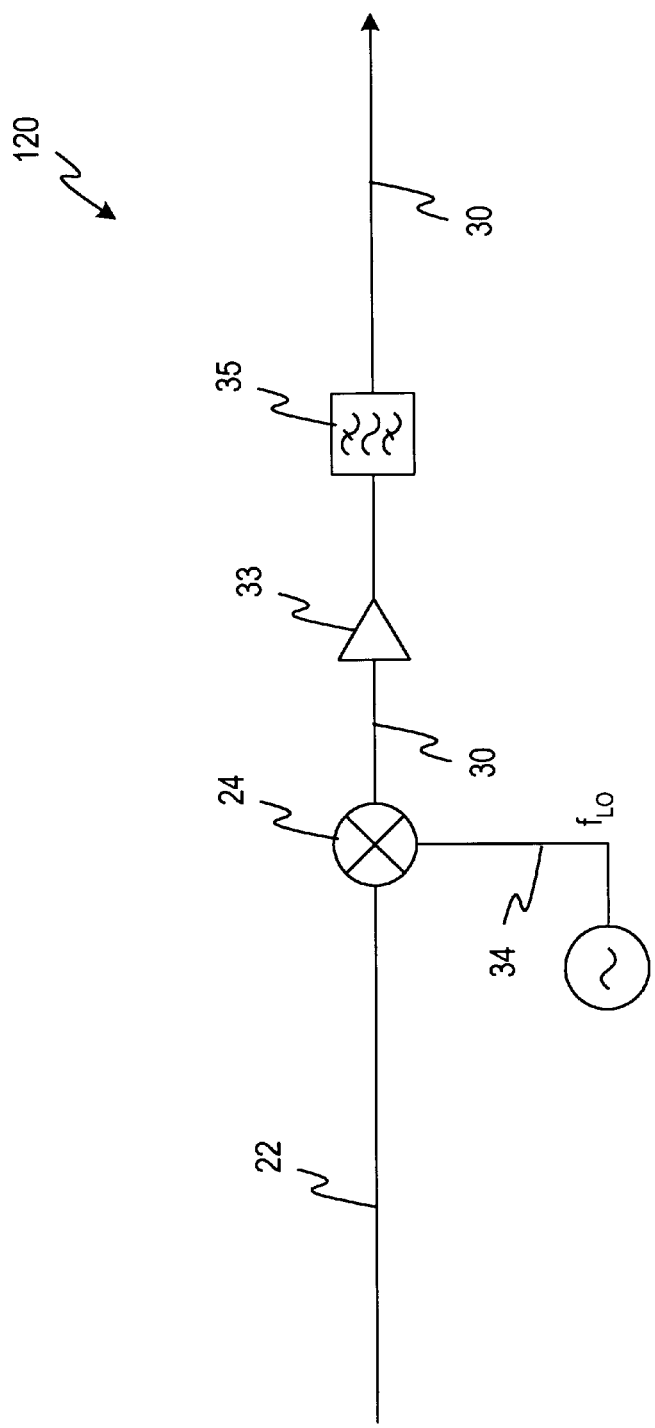
FIGS. 4a and 4b are schematic diagrams of up converter modules of the digital repeater.

A first RF down converter 120 is included for down converting the amplified signals 22. As shown in FIG. 4a, the RF down converter 120 receives the amplified signals 22. The amplified signals 22 are combined by a mixer 24 with a local oscillator (LO) signal 34 to produce intermediate frequency (IF) signals 30. In one embodiment, the IF is between about 10 MHz to 30 MHz, depending on the application. Thus, where the LO signal 34 is 1860 MHz and the amplified signals 22 are 1850 MHz, then the IF signals would be 10 MHz. The IF signals 30 are amplified by an amplifier 33 and filtered by a band pass filter 35. The band pass filter 35 significantly reduces the complex components or images of the amplified signal 22 and the LO signal 34. The IF signals 30 each contain one or more signals each at a different frequency (channel). All of the downlink channels pass through the first RF down converter 120.

In one embodiment, the amplifiers used in the repeater 10, such as the amplifier 33, comprise relatively low power, linear integrated circuit chip components, such as monolithic microwave integrated circuit (MMIC) chips. These chips may comprise chips made by the Gallium Arsenide (GaAs) heterojunction transistor manufacturing process. However, silicon process chips or CMOS process chips might also be utilized.

Some examples of MMIC power amplifier chips are as follows:

1. RF Microdevices PCS linear power amplifier RF 2125P, RF 2125, RF 2126 or RF 2146, RF Micro Devices, Inc., 7625 Thorndike Road, Greensboro, N.C. 27409, or 7341-D W. Friendly Ave., Greensboro, N.C. 27410;

2. Pacific Monolithics PM 2112 single supply RF IC power amplifier, Pacific Monolithics, Inc., 1308 Moffett Park Drive, Sunnyvale, Calif.;

3. Siemens CGY191, CGY180 or CGY181, GaAs MMIC dual mode power amplifier, Siemens AG, 1301 Avenue of the Americas, New York, N.Y.;

4. Stanford Microdevices SMM-208, SMM-210 or SXT-124, Stanford Microdevices, 522 Almanor Avenue, Sunnyvale, Calif.;

5. Motorola MRFIC1817 or MRFIC1818, Motorola Inc., 505 Barton Springs Road, Austin, Tex.;

6. Hewlett Packard HPMX-3003, Hewlett Packard Inc., 933 East Campbell Road, Richardson, Tex.;

7. Anadigics AWT1922, Anadigics, 35 Technology Drive, Warren, N.J. 07059;

8. SEI Ltd. P0501913H, 1, Taya-cho, Sakae-ku, Yokohama, Japan; and

9. Celeritek CFK2062-P3, CCS1930 or CFK2162-P3, Celeritek, 3236 Scott Blvd., Santa Clara, Calif. 95054.

Figure 3:
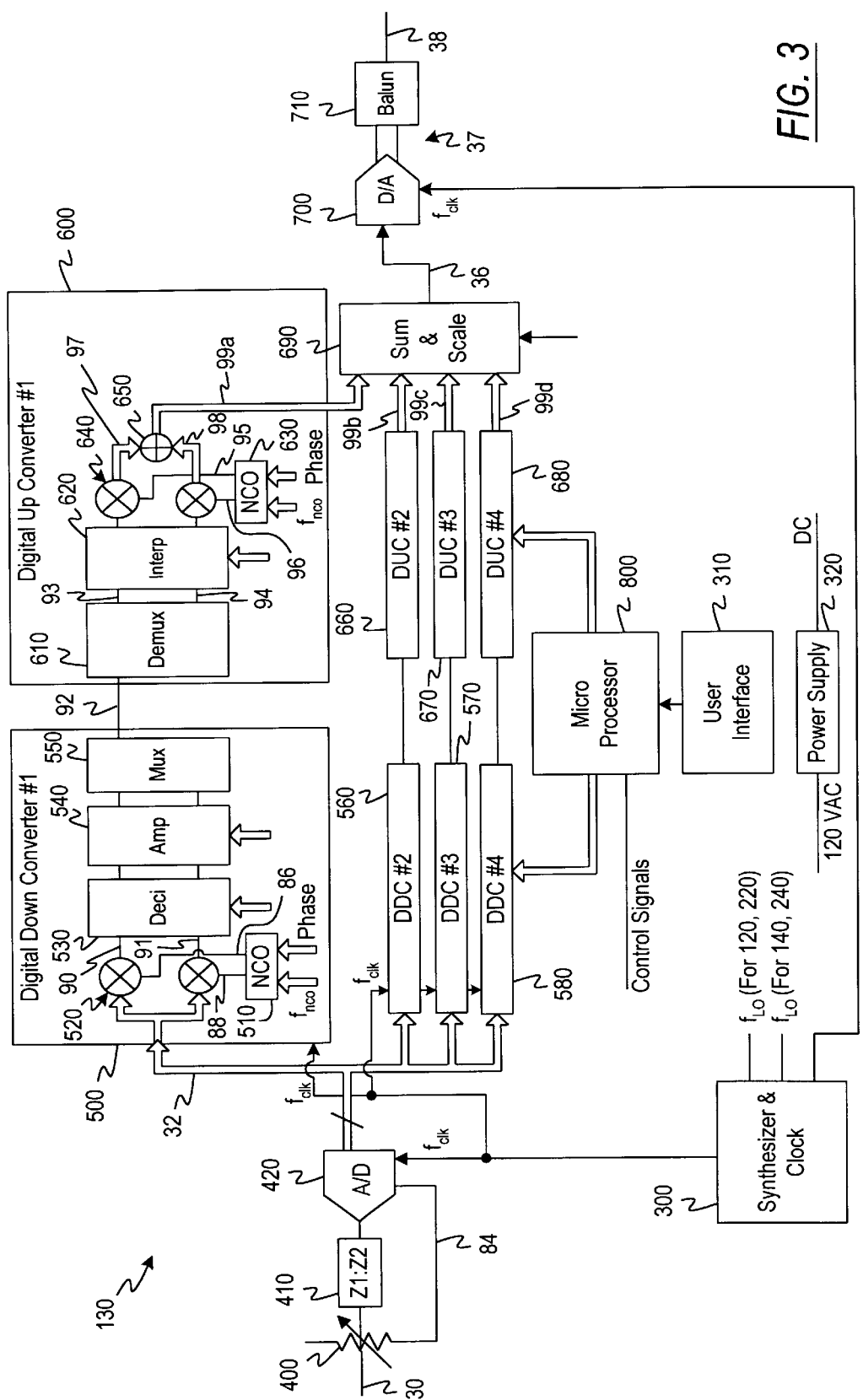
FIG. 3 is a schematic diagram of a digital signal processor module of the digital repeater.

Returning to FIG. 2, the forward path 16 further includes a first multichannel Digital Signal Processor (DSP) module 130 which includes an analog-to-digital converter 420 which converts the incoming wideband IF signals 30 into digital signals 32, as shown in FIG. 3. In one embodiment, the DSP module is a four channel DSP; however, one or more DSPs each capable of processing one or more channels could alternatively be used. The digital signals 32 contain one or more channels. A first channel of the digital signals 32 is then digitally processed by the first digital down converter 500. Similarly, the other channels of the digital signals 32 are digitally processed by the respective digital down converters 560, 570 and 580. The first channel is digitally down converted to a baseband center frequency around 0 Hz and applied to a series of software configurable low pass filters and gain stages, as described in detail below in relation to FIG. 3. The processed channel is then digitally up converted back to the original IF frequency. In the illustrated embodiment, the four processed signals from the four channels are then digitally added together to form one digital signal 36 (having one or more channels of information, each channel having a different frequency). The digital signal 36 is then applied to a digital-to-analog converter 700. The DSP module 130 outputs second IF signals 38.

Figure 5A:
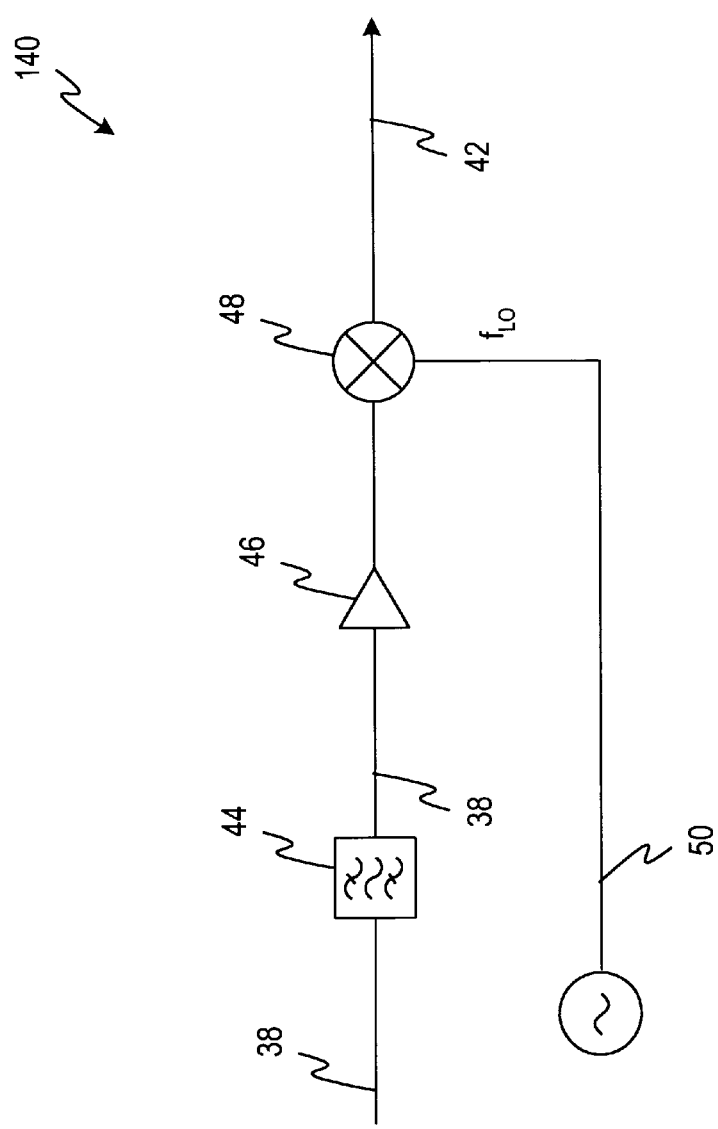
FIGS. 5a and 5b are schematic diagrams of down converter modules of the digital repeater.

Returning to FIG. 2, an RF up converter 140 is included for up converting the second IF signals 38. The up converter 140 converts the second IF signals 38 to second RF signals 42, as shown in FIG. 5a. The second IF signals 38 are filtered by a band pass filter 44 and amplified by an amplifier 46. The amplified signals are then combined by a mixer 48 with a local oscillator (LO) signal 50 to produce the second RF signals 42. The filter 44 significantly reduces the complex components or images of the IF signals 38 and is the LO signal 50. The IF signals 38 each contain one or more signals each at a different frequency (channel). In one embodiment, the IF is between about 10 MHz to 30 MHz, depending on the application. Thus, where the LO signal 50 is 1860 MHz and the IF is 10 MHz, then the second RF signals 42 would be 1850 MHz. All of the uplink channels pass through the up converter 140.

Returning to FIG. 2, a power amplifier 150 is included for amplifying the second RF signals 42 into an amplified signal 51 which is at the desired output level. The linearity of the power amplifier 150 determines the upper limit of the dynamic range of the repeater 10. The output of the power amplifier 150 is isolated from the reverse path 18 by the second diplexer 200 which is connected between the output of the forward path 16 and the input of the reverse path 18. The diplexer 200 acts as a band pass filter adapted to only pass outgoing filtered signals 43 within the first specific band of frequencies. Again, in one embodiment, the first specific band of frequencies are between about 1850 MHz and 1865 MHz; 1870 MHz and 1885 MHz; and/or 1890 MHz and 1905 MHz. The filtered signals 43 are sent to the broadcast antenna 12 and transmitted to the receiving apparatus 14.

The diplexer 200 also acts as a band pass filter adapted to only pass incoming filtered signals 54 within a second specific band of frequencies. In one embodiment, the second specific band of frequencies are between about 1930 MHz and 1945 MHz; 1950 MHz and 1965 MHz; 1970 MHz and 1985 MHz. Thus, the diplexer 200 allows one port to be a common connection for outgoing downlink signals 43 and incoming uplink signals 52. The diplexers 100 and 200 determine which operating frequency band(s) will be accepted by the repeater 10. As in the prior example, a PCS 1900 MHz repeater would operate in one of three bands: sub-band A, sub-band B or sub-band C. The operating frequencies for each band are as follows:

| Band | Downlink Input Frequency | Uplink Output Frequency |
|------|--------------------------|-------------------------|
| A | from 1930 to 1945 MHz | from 1850 to 1865 MHz |
| B | from 1950 to 1965 MHz | from 1870 to 1885 MHz |
| C | from 1970 to 1985 MHz | from 1890 to 1905 MHz |

The diplexer 200 serves to separate low power uplink input signals from high power downlink output signals. For example, the power level of the outgoing downlink signal (filtered signal 43) is typically several Watts while the power level of the incoming uplink signal (RF signal 52) is typically in the micro-Watt to milli-Watt range. The diplexer 200 isolates the uplink path from the high power downlink signals. In one embodiment, the reverse path 18 also includes a low noise amplifier 210 for amplifying the filtered signals 54 and producing amplified signals 56. The low noise amplifier 210 sets the repeater noise figure in the uplink path 18. The low noise amplifier 210 is a wideband RF device whose input must be isolated from high power downlink signals that can prevent proper operation of the repeater 10. The diplexer 200 isolates the low noise amplifier 210 from those high power downlink signals.

Figure 4B:
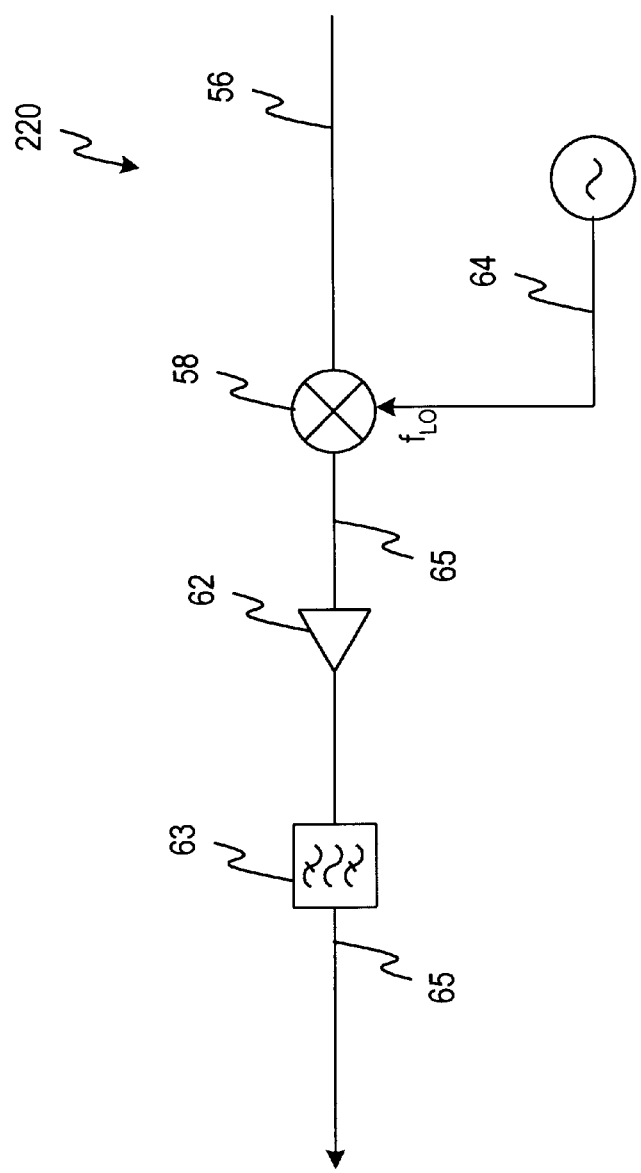

A second RF down converter 220 is included for down converting the amplified signals 56. As shown in FIG. 4b, the RF down converter 220 receives the amplified signals 56. The amplified signals 56 are combined by a mixer 58 with a local oscillator (LO) signal 64 to produce intermediate frequency (IF) signals 65. In one embodiment, the IF is between about 10 MHz to 30 MHz, depending on the application. Thus, where the LO signal 64 is 1940 MHz and the amplified signals 56 are 1930 MHz, then the IF signals would be 10 MHz. The IF signals 65 are amplified by an amplifier 62 and filtered by a band pass filter 63. The band pass filter 63 significantly reduces the complex components or images of the amplified signals 56 and the LO signal 64. All of the uplink channels pass through the second RF down converter 220.

Returning to FIG. 2, the reverse path 18 further comprises a second multichannel DSP module 230 which operates in the same manner as the DSP module 130. The incoming wideband IF signals 65 from the second RF down converter 220 are sampled by the analog-to-digital converter 420 and separated into digital signals 32, as shown in FIG. 3. In one embodiment, the DSP module is a four channel DSP; however, one or more DSPs each capable of processing one or more channels could alternatively be used. A first channel of the digital signals 32 is then digitally processed by the first digital down converter 500. Similarly, the other channels of the digital signals 32 are digitally processed by the respective digital down converters 560, 570 and 580. The first channel is digitally down converted to a baseband center frequency around 0 Hz and applied to a series of software configurable low pass filters and gain stages, as described in detail below in relation to FIG. 3. The processed channel is then digitally up converted back to the original IF frequency. The multiple processed signals from each channel are then digitally added together to form one digital signal 36 (having one or more channels of information, each channel having a different frequency). The digital signal 36 is then applied to a digital-to-analog converter 700. The DSP module 230 outputs fourth IF signals 70, as shown in FIG. 2.

Figure 5B:
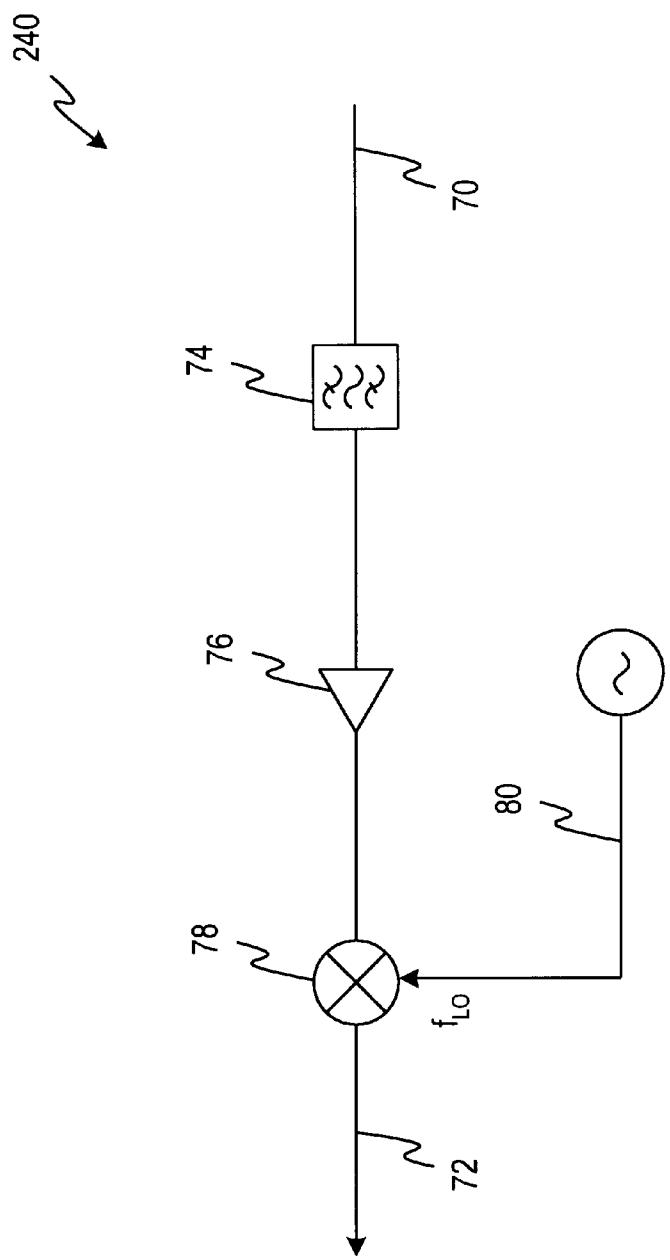

A second RF up converter 240 is included for up converting the fourth IF signals 70. The up converter 240 converts the fourth IF signals 70 to fourth RF signals 72, as shown in FIG. 5b. The fourth IF signals 70 are filtered by a band pass filter 74 and amplified by an amplifier 76. The amplified signals are then combined by a mixer 78 with a local oscillator (LO) signal 80 to produce the fourth RF signals 72. In one embodiment, the IF is between about 10 MHz to 30 MHz, depending on the application. Thus, where the LO signal 80 is 1940 MHz and the IF is 10 MHz, then the second RF signals 72 would be 1930 MHz. The band pass filter 74 significantly reduces the complex components or images of the amplified signal 70 and the LO signal 80. All of the uplink channels of the repeater pass through the up converter 240.

A second power amplifier 250 is included for amplifying the fourth RF signals 72 into amplified signals 81 which are at the desired output level. The linearity of the power amplifier 250 determines the upper limit of the dynamic range of the repeater 10. The output of the power amplifier 250 is isolated from the forward path 16 by the first diplexer 100 which is connected between the output of the reverse path 18 and the input of the forward path 16. The diplexer 100 acts as a band pass filter adapted to receive the amplified signals 81 and only pass outgoing filtered signals 82 within the second specific band of frequencies. Again, in one embodiment, the second specific band of frequencies are between about 1930 MHz and 1945 MHz; 1950 MHz and 1965 MHz; and/or 1970 MHz and 1985 MHz. The filtered signals 82 are sent to the link antenna 8 and transmitted to the BS antenna 6.

Referring to FIGS. 2 and 3, a synthesizer/clock 300 is included for generating the LO signals 34, 50, 64, and 80 for the RF down converters 120, 220 and the RF up converters 140, 240. In one embodiment, the RF down converter 120 and the RF up converter 140 use the same LO frequency; thus, the LO signals 34, 50 must be sufficiently isolated from each other to prevent cross-talk between the RF down converter 120 and the RF up converter 140. In one embodiment, the second RF down converter 220 and the second RF up converter 240 also use the same LO frequency; thus the LO signals 64, 80 must be sufficiently isolated from each other to prevent cross-talk between the second RF down converter 220 and the second RF up converter 240. Therefore, the synthesizer/clock 300 provides LO signals that are sufficiently isolated from each other to prevent cross-talk between the forward and reverse paths 16, 18. The synthesizer/clock 300 also generates the sampling clock $f_{clk}$ for the analog-to-digital converter 420, the DSP modules 130, 230 and the digital-to-analog converter 700.

A user interface 310 is provided for interacting with the DSP modules 130, 230. The user interface 310 allows the DSP modules 130, 230 to be programmed to adjust and configure certain parameters, as described below in connection with FIG. 3. A power supply 320 converts the primary alternating current (AC) power to direct current (DC) power.

Referring to FIG. 3, a detailed schematic of the DSP module 130 is shown. Because the DSP module 230 operates in the same manner as the DSP module 130, only the module 130 is illustrated and described in detail. In one embodiment, the DSP module 130 is a four channel DSP capable of processing four channels simultaneously; however, one or more DSPs each capable of processing one or more channels could alternatively be used. An adjustable attenuator 400 is provided to accommodate a variety of IF signal levels. An impedance transformer 410 converts the low impedance output of the attenuator 400 to a high impedance output suitable for the input of the analog-to-digital converter 420. If, for example, the input IF signals 30 are too large for the analog-to-digital converter 420, then a feedback signal 84 causes the attenuation to increase, thereby reducing the signal level present at the input of the impedance transformer 410. The analog-to-digital converter 420 converts the incoming wideband IF signals 30 to the digital signals 32 which are sampled at a rate determined by $f_{clk}$. In one embodiment, the approximate value of $f_{clk}$ is 60 MHz depending on the application.

A digital down converter 500 is provided. Because each of the channels operate in the same manner, only the digital down converter 500 is described and illustrated in detail. The digital down converter 500 includes a numerically controlled oscillator (NCO) 510. The frequency of the NCO 510 determines which channel of the digital signals 32 is processed, i.e., it determines the center frequency around which the digital down converter 500 is tuned. The NCO 510 can be tuned (through the user interface 310) to discrete frequencies with a separation of less than, e.g., 1 Hz. In one embodiment, the useable frequency range of the NCO 510 is 0 Hz to approximately $0.4*f_{clk}$. The NCO 510 produces two LO signals at the same output frequency, an in-phase version 86 and a quadrature version 88 which is shifted 90 degrees (to produce a ¼ cycle delay) with respect to the in-phase version 86. The output frequency and the phase of the LO signals are programmable via the user interface 310.

A pair of digital mixers 520 down convert the frequency of the specified channel of the digital signals 32 to a frequency determined by the NCO 510. When the frequency from the NCO 510 is equal to the frequency of the specified channel, the output of the mixers are centered around 0 Hz. One of the mixers uses the in-phase version 86 of the LO signal from the NCO 510. This mixer converts the specified channel into an in-phase, down converted digital signal 90 centered around 0 Hz. The second one of the mixers uses the quadrature version 88 of the LO signal from the NCO 510. This mixer converts the specified channel into a quadrature, down converted digital signal 91 centered around 0 Hz. At this point, the rate of samples produced by each mixer is equal to the original sample rate, $f_{clk}$.

A digital decimator 530 includes a digital low pass filter. The digital decimator 530 discards samples of the down converted digital signals 90, 91 that are not needed. This is possible because the signal of interest is centered around 0 Hz and occupies a narrow bandwidth. The decimation rate is a measure of the number of samples discarded. As the decimation rate increases, the bandwidth of the undiscarded samples decreases. The decimation rate is programmable via the user interface 310. The digital low pass filter is a Finite Impulse Response (FIR) type filter with programmable coefficients that define the shape of the filter. The filter coefficients are also programmable via the user interface 310.

The digital down converter 500 further includes a two channel digital amplifier 540. One channel of the digital amplifier 540 amplifies the in-phase, down converted digital signal 90 and a second channel amplifies the quadrature, down converted digital signal 91. Both channels of the digital amplifier 540 are set to the same gain. In one embodiment, the digital amplifier 540 has a gain range of 0 to 28 dB in steps of approximately 0.1 dB. The amount of gain is programmable via the user interface 310. Thus, a user can control the coverage area of the repeater 10 by adjusting the gain of the digital amplifier 540.

A digital multiplexer 550 is included for converting the in-phase, down converted digital signal 90 and the quadrature, down converted digital signal 91 from the output of the digital amplifier 540 into one multiplexed signal 92 having the in-phase and quadrature samples interleaved.

Digital down converters 560, 570, and 580 of the DSP module 130 operate in the same manner as the above described digital down converter 500.

A digital up converter 600 is also provided. Because each of the channels operate in the same manner, only the digital up converter 600 is described and illustrated in detail. The digital up converter 600 includes a digital demultiplexer 610 which converts the multiplexed signal 92 from the digital down converter 500 into separate in-phase and quadrature signals 93, 94.

A digital interpolator 620 includes a digital low pass filter. The digital low pass filter is a FIR type filter with programmable coefficients. These coefficients define the shape of the filter. The filter coefficients are programmable via the user interface 310. The digital interpolator 620 generates data samples that are needed in order to increase the sample rate to the original $f_{clk}$ frequency. The interpolation rate is a measure of how many samples are generated. Generally, the interpolation rate is equal to the decimation rate used for the digital decimator 530. The interpolation rate is also programmable via the user interface 310.

The digital up converter 600 further includes a numerically controlled oscillator (NCO) 630. The frequency of the NCO 630 determines the frequency at which the up converter is tuned. This item can be tuned to discrete frequencies with a separation of less than 1 Hz. In one embodiment, the useable frequency range of the NCO 630 is 0 Hz to approximately $0.4*f_{clk}$. The NCO 630, like the NCO 510, produces two LO signals at the same output frequency, an in-phase version 95 and a quadrature version 96 which is shifted 90 degrees (to produce a ¼ cycle delay) with respect to the in-phase version 95. The output frequency and the phase of the LO signals are programmable via the user interface 310.

A pair of digital mixers 640 up convert the frequency of the separate signals 93, 94 centered at 0 Hz to the frequency programmed into the NCO 630. One of the mixers uses the in-phase version 95 of the LO signal from the NCO 630. This mixer converts the separate signal 93 into an in-phase, up converted digital signal 97 centered around the IF. The second one of the mixers uses the quadrature version 96 of the LO signal from is the NCO 630. This mixer converts the separate signal 94 into a quadrature, up converted digital signal 98 centered around the IF. At this point, the rate of samples produced by each mixer is once again equal to the original sample rate, $f_{clk}$.

A digital adder 650 is included for algebraically adding the in-phase, up converted digital signal 97 and the quadrature, up converted digital signal 98 to produce a first output signal 99a. Channels 660, 670, and 680 of the digital up converter 600 operate in the same manner as the above described digital up converter channel. In one embodiment, the channels 660, 670, and 680 produce output signals 99b, 99c, and 99d, respectively.

A multichannel digital adder 690 is included. The digital adder 690 algebraically adds the digital output signals, e.g., 99a–99d, and applies a programmable scale factor (from 0 to 1) to the sum of the output signals 99a–99d. The scale factor prevents the summed channels from overflowing. For example, where there are four channels and each channel processes 16-bit words, the sum of the four 16-bit words could be greater than 16 bits. Therefore, the sum is scaled to prevent an overflow situation. The digital scale factor is programmable via the user interface 310.

The digital-to-analog converter 700 converts the sum of the output signals, e.g., 99a–99d, to a differential analog signal 37. A differential signal is a signal with a magnitude equal to the difference between the voltage potentials at two ports. A balanced to unbalanced signal transformer 710 is provided for converting the differential analog signal 37 to a single, low impedance analog output signal (the second IF signals 38 of FIG. 2). This single output signal uses ground (0 volts) as its reference.

A microprocessor 800 controls the digital down converter 500 and the digital up converter 600. The microprocessor 800 provides the multichannel DSP module 130 with programming data and reports the status of the module 130. The microprocessor 800 interacts with the user interface 310 to allow a user to program and configure the DSP module 130 to set, e.g., the gain of the digital signal processors, the frequency and phase of the in-phase and the quadrature versions of the first digital signal, the rate at which the first digital signal is decimated, the amplification of the digital signal to control the coverage area of the digital repeater, the rate at which the separate signals are interpolated, and the digital scale factor.

Figure 6A:
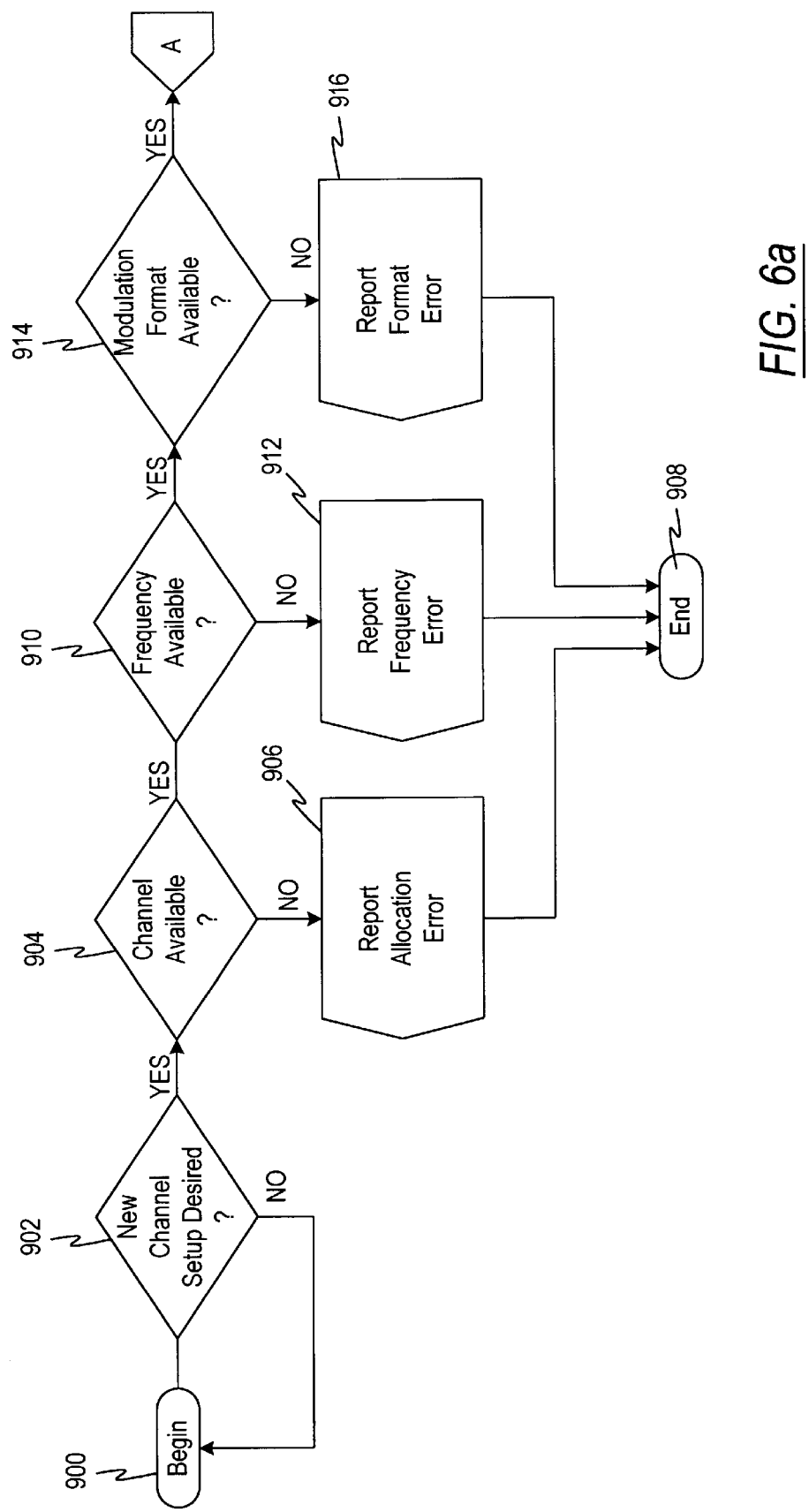

Referring to FIGS. 6a and 6b, there is shown a flowchart depicting how the multichannel DSP module 130 is programmed. The microprocessor 800 begins executing the program in block 900. The microprocessor 800 then monitors the user interface 310 to determine whether a new channel setup is desired by a user (block 902). If a no is indicated, the microprocessor 800 returns to block 900. Otherwise, if a yes is indicated, the microprocessor 800 determines whether the new channel requested by the user is installed on the DSP module, i.e., is the channel available (block 904). The DSP module may have, for example, between 1 and 16 available channels. If the new channel is not available, the microprocessor 800 reports an allocation error in block 906 and the program ends (block 908). Otherwise, if the requested channel is installed and available, the microprocessor 800 determines whether the entered frequency is a valid frequency, i.e., whether the frequency is available (block 910). For example, the valid center frequencies may be multiples of 5 kHz. Therefore, if a frequency of 27 kHz were selected, this frequency would not be available. If the frequency is not available, the microprocessor 800 reports a frequency error in block 912 and the program ends (block 908). Otherwise, the microprocessor 800 determines in block 914 whether the modulation format corresponding to the new channel is available. If the modulation format is not available, the microprocessor 800 reports a format error in block 916 and the program ends (block 908). Otherwise, the microprocessor 800 programs the digital down converter NCO 510 (block 918) and the digital up converter NCO 630 (block 920) by using data from the NCO look-up table (block 922).

Then, the microprocessor 800 programs the digital down converter decimator 530 (block 924) and the digital up converter interpolator 620 (block 926) by using data from the decimator/interpolator look-up table (block 928). The microprocessor 800 next programs the digital down converter FIR filter 530 (block 930) and the digital up converter FIR filter 620 (block 932) by using data from the FIR filter look-up table (block 934). The microprocessor 800 then programs the digital down converter amplifier 540 (block 936) and the digital up converter scale factor 690 (block 938) by using data from the gain/scale look-up table (block 940). The microprocessor 800 proceeds to flush the registers (block 942) and the program ends (block 944). During the period of time when a user is programming the DSP module, no data is being written to the data registers. Once the programming routine of FIGS. 6a and 6b is completed, the registers are flushed to clear any old data contained therein. Then, the repeater begins operating using the newly programmed parameters and only new data is processed, the old data having been flushed from the data "pipeline."

It is to be understood that the BS antenna 6 could be replaced with one or more repeater systems each including a link antenna 8, a digital repeater 10, and a broadcast antenna 12. In this way, repeater systems can be daisy-chained together to extend the range of an originating base station antenna.

The digital repeater 10 described above operates independent of the frequency band being processed. That is, the repeater 10 may be used in any frequency band, including, but not limited to, the following:

a) Cellular (800 MHz band)
b) PCS (1800 and 1900 MHz bands)—(Personal Communications Service)
c) GSM (900 and 1800 MHz bands)—(Global System for Mobile communications)
d) MMDS (2500 MHz band)—(Multi-channel Multipoint Distribution Service)
e) LMDS (26 GHz band)—(Local Multipoint Distribution Service)
f) Bluetooth Applications (2400 MHz band)—(Bluetooth is the name of a wireless protocol standard, created by Ericsson)
g) Indoor Wireless LANs (2400 MHz band)—(Local Area Network)
h) 3G (3rd Generation PCS systems) at 1900 MHz (U.S.) and 1800–2200 MHz (Europe)

Therefore, the present invention provides a digital repeater 10 that includes a pair of digital signal processors, one for each path, that are software configurable such that a user can program and configure certain parameters. These parameters include, e.g., the gain of the digital signal processors, the frequency and phase of the in-phase and the quadrature versions of the first digital signal, the rate at which the first digital signal is decimated, the amplification of the digital signal to control the coverage area of the digital repeater, the rate at which the separate signals are interpolated, and the digital scale factor.

Furthermore, the digital repeater 10 is capable of transmitting and receiving multiple channels using only a single RF down converter/RF up converter pair for each path. The digital repeater 10 provides greater channel resolution which allows more channels to be placed closer together. This is accomplished by using precise digital filters that have less than a 1 kHz frequency difference between the 15 dB and 40 dB points. The digital repeater 10 can process multiple modulation formats without changing the repeater hardware; instead, the digital signal processors are programmable such that changing the modulation format is quick and easy. In fact, the digital repeater 10 is programmable to match the modulation format used by many communications networks. The digital repeater 10 can even automatically detect the modulation format used by a particular network and change the bandwidth of the filters based on the modulation format detected. Moreover, the digital repeater 10 provides virtually identical filter performance despite impedance mismatches.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. A method of repeating radio frequency (RF) signals comprising:
   in a downlink path, down converting a first RF signal to an intermediate frequency (IF) signal;
   converting the IF signal into a digital signal;
   processing the digital signal with a digital signal processor;
   amplifying the digital signal into an amplified signal;
   converting the amplified signal into an analog signal;
   up converting the analog signal to a second RF signal suitable for antenna transmission and forwarding the second RF signal to a broadcast antenna; and
   in an uplink path operating generally independently of the downlink path, down converting a third RF signal to an intermediate frequency (IF) signal;
   converting the IF signal into a respective digital signal;
   processing the respective digital signal with a digital signal processor;
   amplifying the respective digital signal into an amplified signal;
   converting the amplified signal Into an analog signal; and
   up converting the analog signal to a fourth RF signal suitable for antenna transmission and forwarding the fourth RF signal to a link antenna;
   in at least one of the uplink and downlink paths producing an in-phase version of the digital signal and a quadrature version of the digital signal, and down converting the in-phase and the quadrature versions of the digital signal to a down converted signal without significantly varying the modulation scheme in that path.

2. The method of claim 1, wherein the processing includes filtering and decimating the digital signal.

3. The method of claim 2, wherein the rate at which the digital signal is decimated is programmable.

4. The method of claim 1, further comprising down converting the in-phase and the quadrature versions of the digital signal to a down converted signal centered around 0 Hz.

5. The method of claim 1, wherein the processing, in at least one of the uplink and downlink paths includes multiplexing the in-phase and the quadrature versions of the digital signal into one multiplexed signal.

6. The method of claim 1, wherein the processing includes demultiplexing the in-phase and the quadrature versions of the digital signal into separate signals.

7. The method of claim 6, wherein the separate signals are interpolated and filtered.

8. The method of claim 7, wherein the rate at which the separate signals are interpolated is programmable.

9. The method of claim 1, further including converting the in-phase and the quadrature versions of the digital signal to an up converted signal having in-phase and quadrature versions.

10. The method of claim 9, further including adding the in-phase and the quadrature versions of the up converted signal.

11. The method of claim 9, wherein the frequency and phase of the in-phase and the quadrature versions of the up converted signal are programmable.

12. The method of claim 1, wherein the frequency and phase of the in-phase and the quadrature versions of the digital signal are programmable.

13. The method of claim 1, wherein the amplifying in at least one of the uplink and downlink paths is programmable to control the coverage area of the signal repeating.

14. The method of claim 1, further including processing a portion of the digital signal corresponding to one channel of the repeater.

15. The method of claim 14, wherein the digital signal includes four channels, further including separately processing each of the four channels.

16. The method of claim 15, further including adding the four processed channels and applying a programmable scale factor.

17. The method of claim 1, wherein the digital signal processor is programmed to configure parameters selected from a group comprising: gain, frequency and phase of the in-phase and the quadrature versions of the digital signal, a decimation rate, amplification of the digital signal, an interpolation rate, and a digital scale factor.

18. A digital repeater for repeating (RF) signals, the digital repeater comprising:
a downlink path including:
a down converter for down converting a first RF signal to an intermediate frequency (IF) signal;
an analog-to-digital converter for converting the IF signal into a digital signal;
a digital signal processor for processing the digital signal and amplifying the digital signal into an amplified signal;
a digital-to-analog converter for converting the amplified signal into an analog signal; and
an up converter for up converting the analog signal to a second RF signal suitable for antenna transmission; and
an uplink path including:
a second down converter for down converting a third RF signal, a second analog-to-digital converter, a second digital signal processor, a second digital-to-analog converter and a second up converter for up converting the analog signal to a fourth RF signal;
the downlink path configured for coupling to a broadcast antenna and the uplink path configured for coupling to a link antenna, each path operating generally independently of the other;
in at least one of the uplink and downlink paths, a numerically controlled oscillator which produces an in-phase local oscillator signal and a quadrature local oscillator signal, and a pair of digital mixers which produce an in-phase version of the digital signal and a quadrature version of the digital signal;
the digital signal processors of at least one of the uplink and downlink paths processing the signals without significantly varying the modulation scheme in that path.

19. The digital repeater of claim 18, wherein the digital signal processor, in at least one of the uplink and downlink paths, is programmable such that the amplification of the digital signal can be adjusted to control the coverage area of the digital repeater.

20. The digital repeater of claim 18, wherein the digital signal processor, in at least one of the uplink and downlink paths, filters and decimates the digital signal.

21. The digital repeater of claim 20, wherein the digital signal processor Is programmable such that the rate at which the digital signal is decimated can be adjusted.

22. The digital repeater of claim 18, wherein the digital mixers down convert the in-phase and the quadrature versions of the digital signal to a down converted signal centered around 0 Hz.

23. The digital repeater of claim 18, wherein the digital signal processor multiplexes the in-phase and the quadrature versions of the digital signal into one multiplexed signal.

24. The digital repeater of claim 18, wherein the digital signal processor demultiplexes the in-phase and the quadrature versions of the digital signal into separate signals having in-phase and quadrature versions.

25. The digital repeater of claim 24, further including a second pair of digital mixers for up converting the in-phase and the quadrature versions of the separate signals to up converted signals having in-phase and quadrature versions.

26. The digital repeater of claim 25, further comprising a digital adder for adding the in-phase and the quadrature versions of the up converted signals.

27. The digital repeater of claim 18, wherein the numerically controlled oscillator controls the frequency and phase of the in-phase and the quadrature versions of the digital signal.

28. The digital repeater of claim 18, wherein the digital signal processor is programmable such that the frequency and phase of the in-phase and the quadrature versions of the digital signal can be adjusted.

29. The digital repeater of claim 18, wherein the digital signal processor, in at least one of the uplink and downlink paths, interpolates and filters the digital signal.

30. The digital repeater of claim 29, wherein the digital signal is programmable such that the rate at which the separate signals are interpolated can be adjusted.

31. The digital repeater of claim 18, further including a user interface for interacting with the digital signal processor in at least one of the uplink and downlink paths.

32. The digital repeater of claim 18, wherein the digital signal processor, in at least one of the uplink and downlink paths, processes a portion of the digital signal corresponding to one channel of the repeater.

33. The digital repeater of claim 32, wherein the digital signal includes four channels.

34. The digital repeater of claim 33, wherein the four channels are separately processed by the digital signal processor.

35. The digital repeater of claim 34, further including a multichannel digital adder for adding the four processed channels and applying a programmable scale factor.

36. The digital repeater of claim 18, wherein the analog-to-digital converter, in at least one of the uplink and downlink paths, is sampled at a predetermined rate.

37. The digital repeater of claim 18, further including a link antenna and a broadcast antenna, the digital repeater being coupled between the link antenna and the broadcast antenna.

38. The digital repeater of claim 18, wherein the local oscillator signals are programmable such that the frequency and phase of the in-phase and the quadrature versions of the digital signals can be adjusted.

39. The digital repeater of claim 18, wherein the IF signal in at least one of the uplink and downlink paths is between about 10 MHz and about 30 MHz.

40. The digital repeater of claim 18, wherein the gain of the digital signal processor, in at least one of the uplink and downlink paths, is between about 0 dB and about 28 dB.

41. The digital repeater of claim 18, wherein the digital signal processor in at least one of the uplink and downlink paths is programmed to configure parameters selected from a group comprising: gain, frequency and phase of the in-phase and the quadrature versions of the digital signal, a decimation rate, amplification of the digital signal, an interpolation rate, and a digital scale factor.

42. The digital repeater of claim 41, further including a user interface for programming the digital signal processor.

43. A digital repeater for transmitting and receiving radio frequency (RF) signals, the digital repeater comprising:
a forward path for receiving a first RF signal, the forward path including:
a first RF down converter for down converting the first RF signal to a first intermediate frequency (IF) signal,
a first analog-to-digital converter for converting the first IF signal into a first digital signal,
a first digital signal processor including a pair of digital mixers which produce an in-phase version of the first digital signal and a quadrature version of the first digital signal, the digital mixers down converting the in-phase and the quadrature versions of the first digital signal to a down converted signal centered around 0 Hz, the first digital signal processor filtering and decimating the first digital signal, amplifying the first digital signal, multiplexing the in-phase and the quadrature versions of the first digital signal into one multiplexed signal, demultiplexing the in-phase and the quadrature versions of the multiplexed signal into separate signals, interpolating and filtering the separate signals, the first digital signal processor further including a second pair of digital mixers and a digital adder, the digital mixers up converting the in-phase and quadrature versions of the separate signals to up converted signals each having in-phase and the quadrature versions, the digital adder adding the in-phase and the quadrature versions of the up converted signals to produce one output signal, and
a first digital-to-analog converter for converting the one output signal into a first analog signal,
a first RF up converter for up converting the first analog signal to a second RF signal suitable for antenna transmission;
a reverse path for receiving a third RF signal, the reverse path including:
a second RF down converter for down converting the third RF signal to a second intermediate frequency (IF) signal,
a second analog-to-digital converter for converting the second IF signal into a second digital signal,
a second digital signal processor for down converting, amplifying, and up converting the second digital signal into an up converted signal,
a second digital-to-analog converter for converting the up converted signal into an analog signal, and
a second RF up converter for up converting the analog signal to a fourth RF signal suitable for antenna transmission.

44. The digital repeater of claim 43, wherein the coverage area of the digital repeater Is controlled by adjusting the gain of the second digital signal processor.

45. The digital repeater of claim 43, wherein the first digital signal processor is programmable such that the amplification of the digital signal can be adjusted to control the coverage area of the digital repeater.

46. The digital repeater of claim 43, wherein the first digital signal processor is programmable such that the frequency and phase of the in-phase and the quadrature versions of the first digital signal can be adjusted.

47. The digital repeater of claim 43, wherein the first digital signal processor is programmable such that the rate at which the first digital signal is decimated can be adjusted.

48. The digital repeater of claim 43, wherein the first digital signal processor is programmable such that the rate at which the separate signals are interpolated can be adjusted.

49. The digital repeater of claim 43, wherein the second digital signal processor includes a second pair of digital mixers which produce an in-phase version of the second digital signal and a quadrature version of the second digital signal, the second pair of digital mixers down converting the In-phase and the quadrature versions of the second digital signal to a second down converted signal centered around 0 Hz.

50. The digital repeater of claim 49, wherein the second digital signal processor is programmable such that the frequency and phase of the in-phase and the quadrature versions of the second digital signal can be adjusted.

51. The digital repeater of claim 43, further including a user interface for interacting with the first digital signal processor.

52. The digital repeater of claim 43, wherein the first digital signal processor processes a portion of the digital signal corresponding to one channel of the repeater.

53. The digital repeater of claim 43, wherein the first digital signal includes four channels.

54. The digital repeater of claim 43, wherein the four channels are separately processed by the first digital signal processor.

55. The digital repeater of claim 54, further including a multichannel digital adder for adding the four processed channels and applying a programmable scale factor.

56. The digital repeater of claim 43, wherein the first IF signal is between about 10 MHz and about 30 MHz.

57. The digital repeater of claim 43, wherein the gain of the first digital signal processor is between about 0 dB and about 28 dB.

58. The digital repeater of claim 43, further including a link antenna and a broadcast antenna, the digital repeater being coupled between the link antenna and the broadcast antenna.

\* \* \* \* \*